US 12,274,932 B2

(12) United States Patent
Dorn et al.

(10) Patent No.: US 12,274,932 B2
(45) Date of Patent: Apr. 15, 2025

(54) METHODS AND SYSTEMS FOR DYNAMICALLY ADJUSTING SOUND BASED ON DETECTED OBJECTS ENTERING INTERACTION ZONE OF USER

(71) Applicants: Sony Interactive Entertainment LLC, San Mateo, CA (US); Sony Interactive Entertainment Inc., Tokyo (JP)

(72) Inventors: Victoria Dorn, San Mateo, CA (US); Celeste Bean, San Mateo, CA (US); Sepideh Karimi, San Mateo, CA (US); Mahdi Azmandian, San Mateo, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 373 days.

(21) Appl. No.: 17/827,577

(22) Filed: May 27, 2022

(65) Prior Publication Data
US 2023/0398435 A1    Dec. 14, 2023

(51) Int. Cl.
*A63F 13/217* (2014.01)
*G06F 3/01* (2006.01)
(Continued)

(52) U.S. Cl.
CPC ............ *A63F 13/217* (2014.09); *G06F 3/011* (2013.01); *G06F 3/165* (2013.01); *H04S 7/304* (2013.01);
(Continued)

(58) Field of Classification Search
CPC .... H01G 4/1227; H01G 4/0085; H01G 4/012; H01G 4/30; H01G 4/1209; H01G 4/1218; C04B 35/638; C04B 35/64; C04B 2235/3201; C04B 2235/3203; C04B 2235/3217; C04B 2235/3224; C04B 2235/3418; C04B 2235/5445; C04B 2235/5454; C04B 2235/6025; C04B 2235/6582; C04B 35/4682; Y02E 60/13
See application file for complete search history.

(56) References Cited

U.S. PATENT DOCUMENTS 9,166,547 B2 * 10/2015 Wang .................... H03G 11/002
2017/0333786 A1 * 11/2017 Mikhailov .......... A63F 13/5252
(Continued)

FOREIGN PATENT DOCUMENTS

FR    2908322 A1 *  5/2008  ............. A63F 13/10
JP    6408634 B2 * 10/2018  ............. A63F 13/00

OTHER PUBLICATIONS

ISR & WO PCT/US2023/067377, dated Aug. 4, 2023, Total 15 pages.

*Primary Examiner* — Oyesola C Ojo
(74) *Attorney, Agent, or Firm* — Kilpatrick Townsend & Stockton LLP

(57) ABSTRACT

Methods and systems for processing audio for a user include identifying an interactive zone of the user as the user is interacting with a video game in a real-world environment. The real-world environment is monitored to detect any changes that can affect the interactive zone. Responsive to detecting changes, a volume of the audio directed to one side or both side of a headphone providing the audio to one or both ears of the user is dynamically adjusted. The adjustment to the audio is to prevent the user from getting distracted while interacting with the video game.

18 Claims, 6 Drawing Sheets

(51) Int. Cl.
*G06F 3/16* (2006.01)
*H04R 5/033* (2006.01)
*H04S 7/00* (2006.01)

(52) U.S. Cl.
CPC .......... *H04R 5/033* (2013.01); *H04R 2430/01* (2013.01); *H04S 2420/01* (2013.01)

(56) References Cited

U.S. PATENT DOCUMENTS

| | | | |
|---|---|---|---|
| 2018/0035216 A1* | 2/2018 | Van Hasselt | A61B 5/121 |
| 2018/0095542 A1 | 4/2018 | Mallinson | |
| 2018/0129278 A1* | 5/2018 | Luchinskiy | G06F 3/0483 |
| 2018/0260187 A1* | 9/2018 | Yasuda | H04M 11/06 |
| 2019/0026071 A1* | 1/2019 | Tamaoki | A63F 13/52 |
| 2019/0335288 A1* | 10/2019 | Latypov | H04S 7/303 |
| 2019/0387341 A1* | 12/2019 | Lyren | H04S 7/30 |
| 2021/0014608 A1* | 1/2021 | Sakuraba | H04R 1/406 |
| 2021/0373676 A1* | 12/2021 | Jorasch | G06F 3/167 |

* cited by examiner

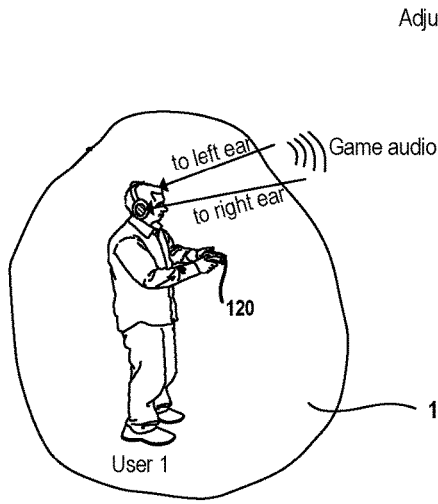
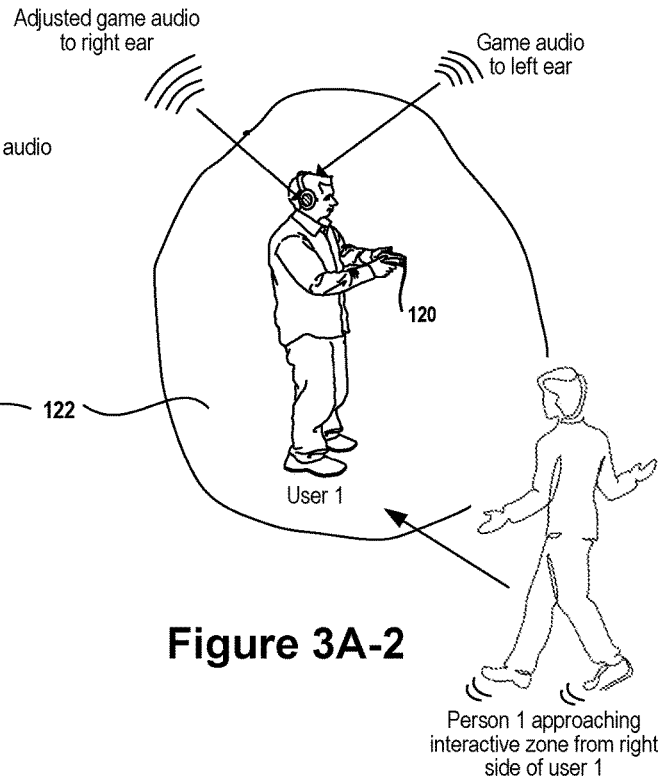
Figure 3A-1
Figure 3A-2
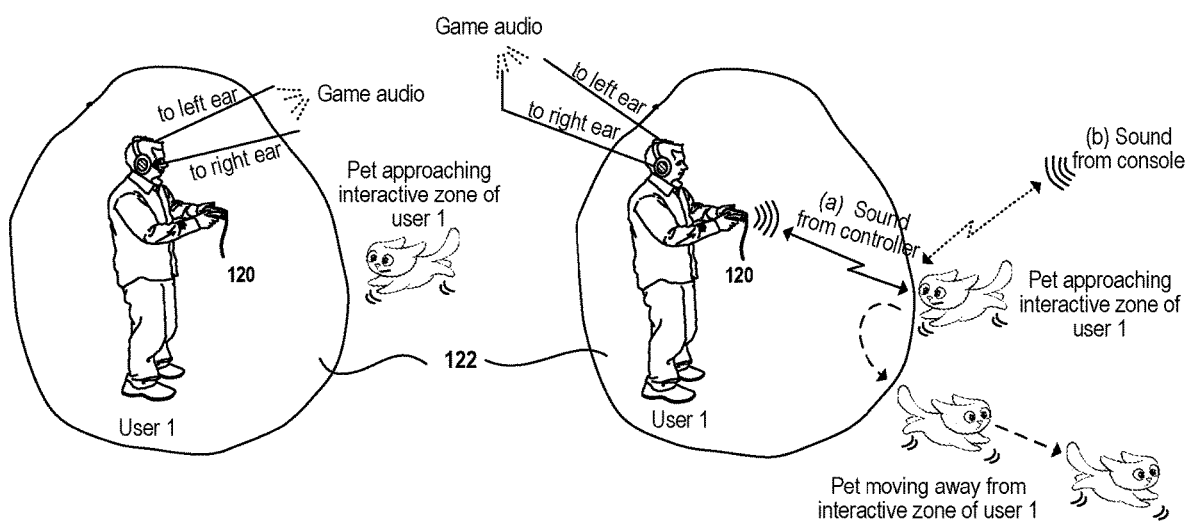
Figure 3B-1
Figure 3B-2

METHODS AND SYSTEMS FOR DYNAMICALLY ADJUSTING SOUND BASED ON DETECTED OBJECTS ENTERING INTERACTION ZONE OF USER

TECHNICAL FIELD

The present disclosure relates to providing audio generated by an interactive application to a user, and more particularly to adjusting audio provided to each ear of the user in accordance to aural attributes associated with each ear of the user and a current state of an interactive zone in which the user is operating.

BACKGROUND OF THE DISCLOSURE

With the growing popularity of video games, (i.e., interactive applications) and the growing number of video games available to users on different devices, providing appropriate feedback to the user in a timely manner becomes especially important. The video games receive game inputs from a user, update the game state, and provide game content that includes current state to the user. The game content includes game scenes and game audio. The game audio can be provided to the user through headphones that is coupled to a game input device or the computing device through which the game input and/or game content is provided. The game input device may be a controller, a keyboard, a touch screen device, control inputs defined on a head mounted display (HMD), or any other input devices.

The user may use the HMD to select and interact with the video game. The HMD is used to provide game input, render game scenes of the video game on a display screen of the HMD, and to provide audio related to game play through headphones. Oftentimes, to have a fully immersive experience, the HMD may be configured to muffle or completely block the sound from the real-world environment. Consequently, the user can be fully immersed in the video game and may not pay much attention to or may not be aware of the real-world environment conditions in the vicinity of the user. When a person or a pet or a real-world object approaches the user, the user may not even be aware of the person, the pet or the object. In such cases, the user can become aware of the person or pet or the object when they come close to the user or directly interact with the user. This sudden interaction from the person or pet or object can distract the user, especially when the user is engaged in game play of a high intensity game, and, consequently, affect the game play of the user.

It is in this context that embodiments of the disclosure arise.

SUMMARY

Implementations of the present disclosure relate to systems and methods used for adjusting audio of an interactive application provided to a user to notify the user of a current state of the real-world environment in which the user is operating with the interactive application. A user may select the interactive application (e.g., a video game) and begin interacting (e.g., game play) with the video game. The video game receives user input from the user during game play and generates game content. The game content includes game audio and game video including game scenes. The game video is forwarded to a display screen of the user for rendering and the game audio is forwarded to a headphone used by the user. The display screen for rendering the game scenes and the headphone for rendering the game audio are associated with a client device used by the user to select and interact with the video game. In response to the user selecting the video game for game play, an interactive zone of the user is established within a real-world environment. The interactive zone identifies a geo location from where the user is accessing and interacting with the video game. With the aid of the headphone and/or the client device (e.g., a head mounted display), the user is fully engrossed in the video game and may not be paying much attention to what is occurring in the real-world environment. When a change occurs in the real-world environment that affects or influences the interactive zone, the change can cause distraction or disruption to the user when the user is interacting with the video game. The distraction or disruption can affect the game play of the video game and lead to the user having less than optimal game play experience.

To avoid such distraction or disruption and to ensure the user has optimal game play experience, the system monitors the real-world environment to detect any changes that are occurring or are anticipated to occur that can affect the interactive zone of the user. When changes affecting the interactive zone are detected or are anticipated, the system and/or the video game provides advanced or timely notification to the user. The notification can be provided by automatically adjusting the volume of the game audio provided to the user via a headphone so as to block some of the unwanted environmental sounds caused by the change. Additionally or alternately, the system can output a sound targeting a person or an object (e.g., pet) that is affecting or anticipated to affect the interactive zone of the user. The output sound can be in the form of a notification to the person or object to indicate a level of immersion of the user in the video game. Monitoring the interactive zone and providing notification to the user or the person/object can assist the user to have an undisturbed and optimal game play experience.

In one implementation, a method for adjusting sound provided to a user is disclosed. The method includes detecting an interactive zone within a real-world environment where the user is interacting with a video game. The video game provides game content for presenting to the user. The game content includes game scenes and the audio associated with the game scenes. The real-world environment is monitored while the user is interacting with the video game, to detect any changes that can affect the interactive zone. In response to detecting the changes affecting the interactive zone, a volume of the audio directed to one side or both sides of a headphone providing the game audio targeted toward one ear or both ears of the user is dynamically adjusted. The amount of adjustment to the audio is to warn the user of the changes occurring or predicted to occur in the real-world environment that affects the user in the interactive zone.

In another implementation, a method for providing a warning to a person is disclosed. The method includes detecting an interactive zone within a real-world environment where a user is interacting with a video game. The video game provides game content for presenting to the user. The game content includes game video and game audio associated with the game video. The real-world environment is monitored, while the user is interacting with the video game, to detect changes affecting the interactive zone. The changes affecting the interactive zone are caused by a person approaching the user in the interactive zone from a first direction. A volume of the game audio directed to a first side of a headphone providing the game audio to a first ear of the user, is dynamically adjusted in response to detecting the changes. The headphone is used to provide the game audio to the user. In addition to adjusting the volume, a sound is automatically generated and targeted toward the person responsible for the changes. The sound includes a notification that is indicative of a level of immersion of the user in the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIGS. 3A-1 and 3A-2 illustrate game audio provided to the user in response to a person approaching the interactive zone of the user while the user is interacting with the video game, in accordance with one implementation of the present disclosure.

FIGS. 3B-1 and 3B-2 illustrate game audio provided to the user and sound generated to scare away a pet away from the interactive zone, in accordance with one implementation of the present disclosure.

DETAILED DESCRIPTION

Figure 1A:
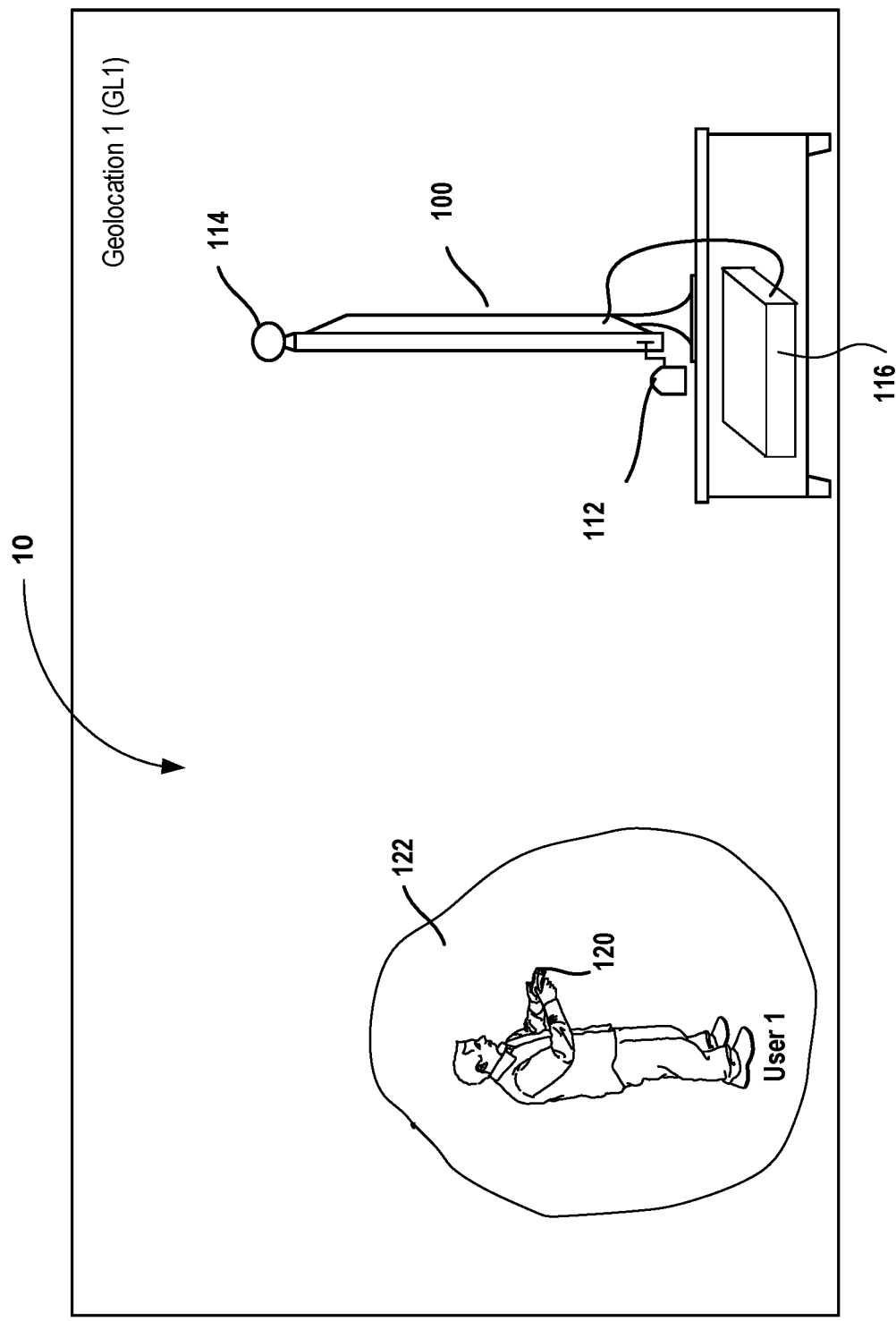
FIG. 1A illustrates a simplified block diagram of a system used to execute a video game providing game scenes and game audio to a user, in accordance with one implementation of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

With the growing number of interactive applications (e.g., video games, metaverse), providing proper game content and proper notification to the user in a timely manner is important to allow the user to have an enriching interactive experience. The user can be playing a video game or interacting in a metaverse space. The game content generated by the video game includes game scenes and game audio associated with the game scenes of the video game. The game scenes are rendered on a display screen of a client device, such as a head mounted display (HMD), a television monitor, a display screen or a display surface associated with a computing device. The game audio is provided through speakers embedded within a headphone worn by the user, wherein the headphones are coupled to the client device (e.g., HMD or the controller or the computing device) that is used for interacting with the video game. Sounds from a real-world environment in which the user is present are captured by microphones embedded within the computing device, the HMD and/or the controller, or disposed in the real-world environment, and processed to determine any changes in a real-world environment.

The changes in the real-world environment are determined by first establishing an interactive zone of the user within the real-world environment where the user is interacting with a video game or in a metaverse space. The interactive zone is defined to be an area proximate to or surrounds the user within the real-world environment. During the user's interaction with the video game or in the metaverse space, the real-world environment is monitored to detect any changes affecting or are predicted to affect the interactive zone. Changes affecting the interactive zone are used to warn the user of the proximity of the person to the user or notify a person of a level of immersion of the user in the video game. For instance, the warning provided to the user may be by way of increasing the sound of game audio directed toward one or both ears of the user so as to block the environmental sound caused by the person or a pet approaching the user interacting in the interactive zone. In another instance, when the user is immersed in a high-intensity game, the notification may be provided to the person to indicate the intensity of the game and the intent of the user (e.g., not to be disturbed) during the user's interaction with the high-intensity game.

The methods and systems are thus configured to determine where unwanted sounds are coming from in the real-world environment that can affect the user in the interactive zone and to either provide a warning to the user of the impending distraction or to notify a person to not bother or interrupt the user while the user is immersed in the video game or the metaverse space. The warning can be provided to the user or to the person as a sound or a voice output. The sound or the voice output directed toward the user can be dynamically adjusted in accordance to a sound score that defines a tolerance level of each ear of the user to different sounds and noise levels.

With the general understanding of the disclosure, specific examples will be described with reference to the various drawings.

FIG. 1A illustrates a simplified block diagram of an example system 10 that is used to process audio provided to a user while the user is immersed in an interactive application, in response to detecting an object approaching an interactive zone of a user, in accordance with some implementations. A user (user 1) is shown to be accessing a video game executing on a game console 116, for game play, from geolocation 1 (GL1). User 1 selects and interacts with the video game using an input device, such as a hand-held game controller (simply referred to henceforth as a "controller") 120, mouse 112, keyboard (not shown), etc. In this implementation, the game console 116 is co-located with the user and configured to execute the video game, receive game inputs provided through the one or more input devices, and return game content for rendering to the user. Game state of the video game is updated using the game inputs provided by the user and game content generated for the current game state is forwarded to the user for rendering. The game content includes game video that is rendered on a display screen 100, such as a Television screen, a computer monitor, a display screen of a head mounted display (HMD) (not shown), a display surface (not shown), etc., and game audio that is rendered through a headphone worn by the user. Aural attributes of each ear of user 1 are determined and the game audio is provided to user 1 in accordance to the aural attributes of said each ear of user 1.

In response to detecting user 1 accessing the video game for game play, the system 10 (e.g., audio processing engine) or the video game monitors the real-world environment to determine if an object (e.g., a person, a pet, or any other real-world object) is approaching user 1 in the interactive zone 122, while user 1 is interacting with the video game. The monitoring can be done using one or more image capturing devices, such as an external camera 114 disposed over the display screen 100 disposed in the real-world environment and/or outward facing camera(s) (not shown) associated with the controller 120 or HMD worn by the user. The images are analyzed to identify an interactive zone 122 of user 1 in the real-world environment and to detect a real-world object/entity (e.g., a person or a pet) approaching user 1 in the interactive zone 122 of the real-world environment. Based on the detection, the game audio provided to user 1 can be adjusted and/or a notification/sound generated and directed toward the person or the pet. For example, when the real-world object/entity is a person approaching user 1, the notification may be provided to the person in the form of a voice output or a sound indicating a level of immersion of the user in the video game. When the object is a pet moving toward user 1, the notification may be a low-pitch sound directed toward the pet to distract the pet away from the interactive zone 122.

Figure 1B:
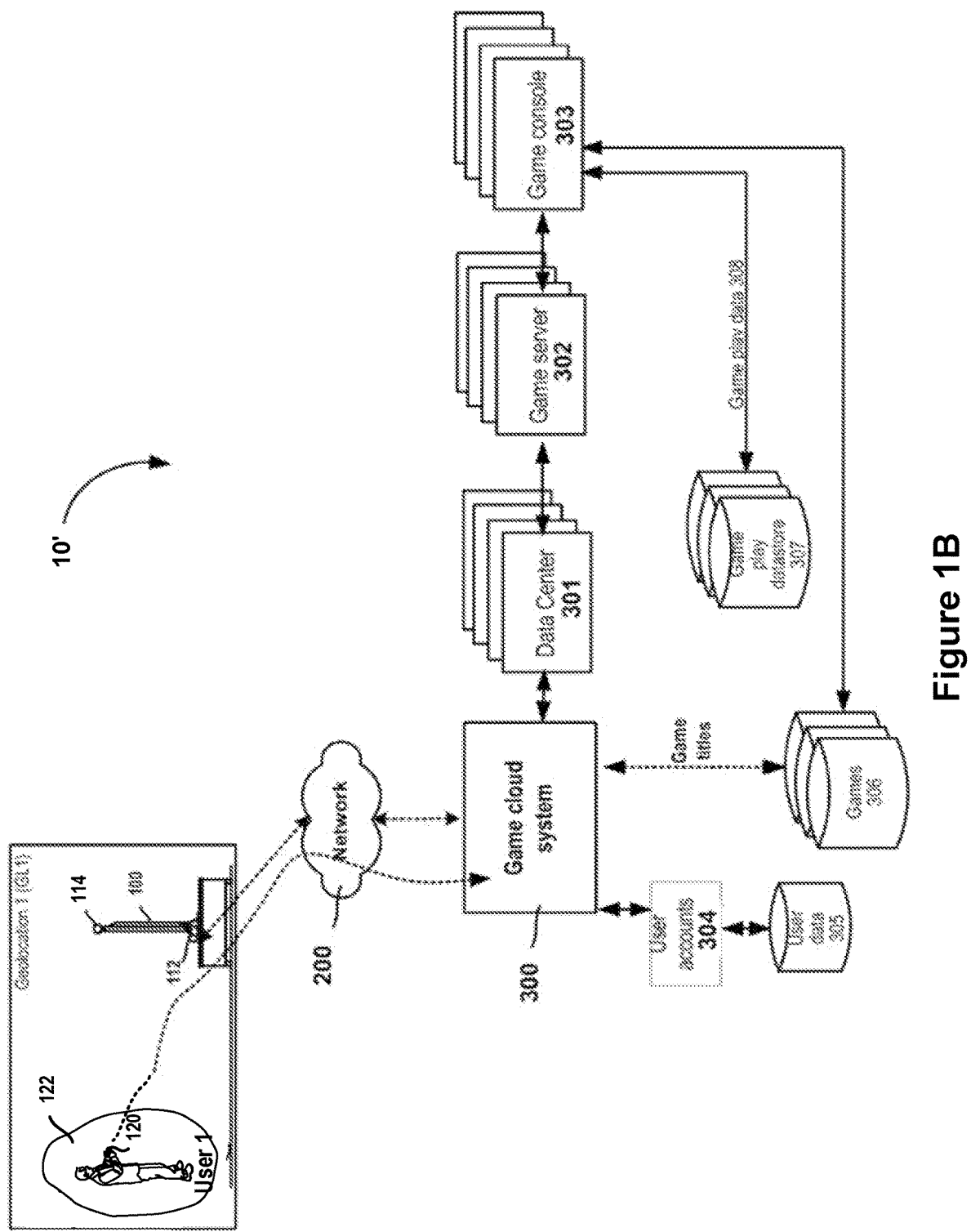
FIG. 1B illustrates a simplified conceptual game cloud system accessible by a plurality of users from different geo locations and generating game content of a video game that provides game audio for presenting to each user, in accordance with one implementation of the present disclosure.

FIG. 1B provides an overview of a game cloud system (GCS) 10' used for accessing games for game play by a user (e.g., user 1), in some alternate implementations. The GCS 10' includes a client device disposed in a geolocation 1 being communicatively coupled to a game cloud system 300 over a network 200. Although implementations of GCS 10' are shown to include a single client device located in geolocation 1 (GL1), the implementations can be extended to include plurality of client devices distributed in a single geolocation (e.g., GL1) or in different geolocations and communicatively connected to the game cloud system 300 over the network 200. The GCS 10' is configured to host a plurality of games and other interactive applications, such as social media applications, content provider applications, metaverse space, etc. The GCS 10' is configured to be accessed by a plurality of users from a single geolocation (e.g., GL1) or from a plurality of geolocations (GL1, GL2, GL3, . . . etc.). The client devices can be any type of client computing device having a processor, memory, and communication capabilities to access the network 200, such as LAN, WAN, wired, wireless or 4G/5G, etc., and may be portable or not portable. Each of the client devices may run an operating system and include network interface to access the network 200 or could be thin clients with network interface to communicate with the game cloud system 300 via the network 200, wherein the game cloud system 300 provides the computation functions. For example, the client devices can be smartphones, mobile devices, tablet computers, desktop computers, personal computers, wearable devices, controllers 120, connected televisions, or hybrids or other digital devices that include monitors or touch screens with a portable form factor.

Users (e.g., players) may access a video game available at the GCS 10' using a user account. In response to an access request for the video game for game play from a user (e.g., user 1), the user account of user 1 is verified against user accounts 304 maintained in a user datastore 305. The request is also verified against a games datastore 306 prior to providing access to the video game. The games datastore 306 maintains a list of game titles that are or can be hosted at the GCS 10' and when new games are introduced, the game titles, game code and information related to the new games are updated to the games datastore 306. It should be noted that although the various implementations are described in relation to a video game (also referred to simply as "game"), the implementations can be extended to include any other interactive applications including accessing metaverse space.

After successful verification of user 1 and user 1's request, the game cloud system 300 identifies a data center 301 where the game can be hosted and sends a signal to the identified data center 301 to load the game associated with the game title identified in the request. In some implementations, more than one data center 301 may be hosting or capable of hosting the game. The game cloud system 300 identifies a data center 301 that is geographically proximal to the geolocation of user 1. The geolocation of user 1 may be determined using Global Position System (GPS) mechanism within the client device, the client device's IP address, the client device's ping information, the user 1's social and other online interactions performed via the client device, to name a few. Of course, the aforementioned ways to detect the geolocation of user 1 is provided as example and it should be noted that other types of mechanisms or tools may be used to determine the geolocation of user 1. Identifying the data center proximal to the geolocation of user 1 may be to reduce the latency when transmitting game related data between the client device of user 1 and the game executing at the identified data center 301.

The data center 301 may include a plurality of game servers 302 and a game server 302 is selected based on the resources available at the game server 302 for hosting the game. In some implementations, an instance of the game may be executed on more than one game server 302 within the identified data center 301. Alternately, the instance of the game may be executed on more than one server 302 within more than one data center 301. The one or more servers 302 in the more than one data centers together provide sufficient hardware/software resources to satisfy the requirements of the game. The game server 302 may be any type of server computing device available in the game cloud system 300, including a stand-alone server, etc. Further, the game server 302 may manage one or more virtual machines supporting a game processor that executes an instance of the game for the player, on a host.

In some implementations, the one or more servers 302 may include a plurality of game consoles (or computing devices) 303 and the game cloud system 300 may identify one or more game consoles or computing devices 303 within the identified one or more servers 302 to load the game. Each of the one or more game consoles/computing devices 303 may be an independent game console or computing device, or may be a rack-mounted server or a blade server. The blade server, in turn, may include a plurality of server blades with each blade having required circuitry and resources for instantiating a single instance of the game, for example. Of course, the game console described above is exemplary and should not be considered restrictive. Other types of game consoles or computing devices, including other forms of blade server may also be engaged for executing an instance of the identified game. Once the one or more game consoles or computing devices are identified, the generic game-related code for the game is loaded onto the one or more game consoles/computing devices and made available to user 1.

In other implementations, the video game may be executed locally at the client device or at the game console 116 communicatively connected to the client device and metadata from the executing video game may be transmitted over the network 200 to the game server 302 at an identified data center 301 of the game cloud system 300 for affecting the game state and for sharing the game play data with other users (e.g., players and spectators). Game inputs to affect game state of the game may be provided from input devices, such as mouse 112, keyboard (not shown), etc.) or control interface (e.g., touch screen, etc.) associated with the client device, or from controller 120 that is communicatively connected to the client device. The game executing at the game cloud system 300 may be a single player game or a multi-player game. In some implementations, the video game may be a massive multiplayer online (MMO) game that allows a plurality of users from across different geolocations to access and play the video game.

During game play of the game, a game engine (e.g., distributed game engine) communicatively connected to game logic of the game manages execution of the game logic of the game, collects and transmits one or more users (i.e., players) inputs received from one or more client devices, to the game logic. The game engine further manages the allocation and synchronization of the functional portions of the game engine to process game data generated by the game logic, in an optimal manner, and generates frames of game data that is transmitted back to the client devices of users for rendering. When the video game is a MMO game, inputs from a plurality of users are used to influence the overall game state of the video game. Game input is processed by the game engine and game content is generated, encoded and streamed to the client device of users, including the user 1's client device, in response to the game inputs provided by the game. As noted, the game content includes game video and game audio associated with the game video. The game video is forwarded as frames of data to the client device for rendering. The game audio is forwarded to headphone worn by the user. The headphone is communicatively coupled to the client device and is configured to adjust the audio provided to the user in accordance to a sound score of the user. The sound score defines a tolerance level of the user to different sounds and noise levels. In some cases, the sound score associated with the left ear may be different from that of the right ear.

While user 1 is engaged in game play of the game, a person or a pet approaching user 1 can cause distraction and can even end up disrupting the game play of user 1. To prevent such distraction or to prepare user 1 of such impending distraction, the system is configured to monitor the real-world environment in the vicinity of user 1 to determine if there are changes occurring in the real-world environment that affects or is predicted to affect the area around user 1. When such changes are detected in the real-world environment in the vicinity of the user, the changes are analyzed and a notification is provided to user 1 or a warning sound to a person or a pet. As noted previously, the notification can be in the form of increased sound of game audio directed toward a ear of user 1 that is in the direction of the change, and/or a sound or notification can also be generated and directed toward the person or the pet that is approaching user 1. The notification to the person is provided to inform the person of a level of immersion of user 1 in the video game.

For example, user 1 may be immersed in a high intensity game or in a high intensity portion of the game or a critical part of the game. In such cases, the person approaching user 1 can be notified to inform the person that user 1 is engaged in the high intensity game and should not be disturbed. Details of detecting the change in the real-world environment where user 1 is operating and providing notification to user 1 and/or to a person/pet causing the change will be described in detail with reference to FIG. 2.

Figure 2:
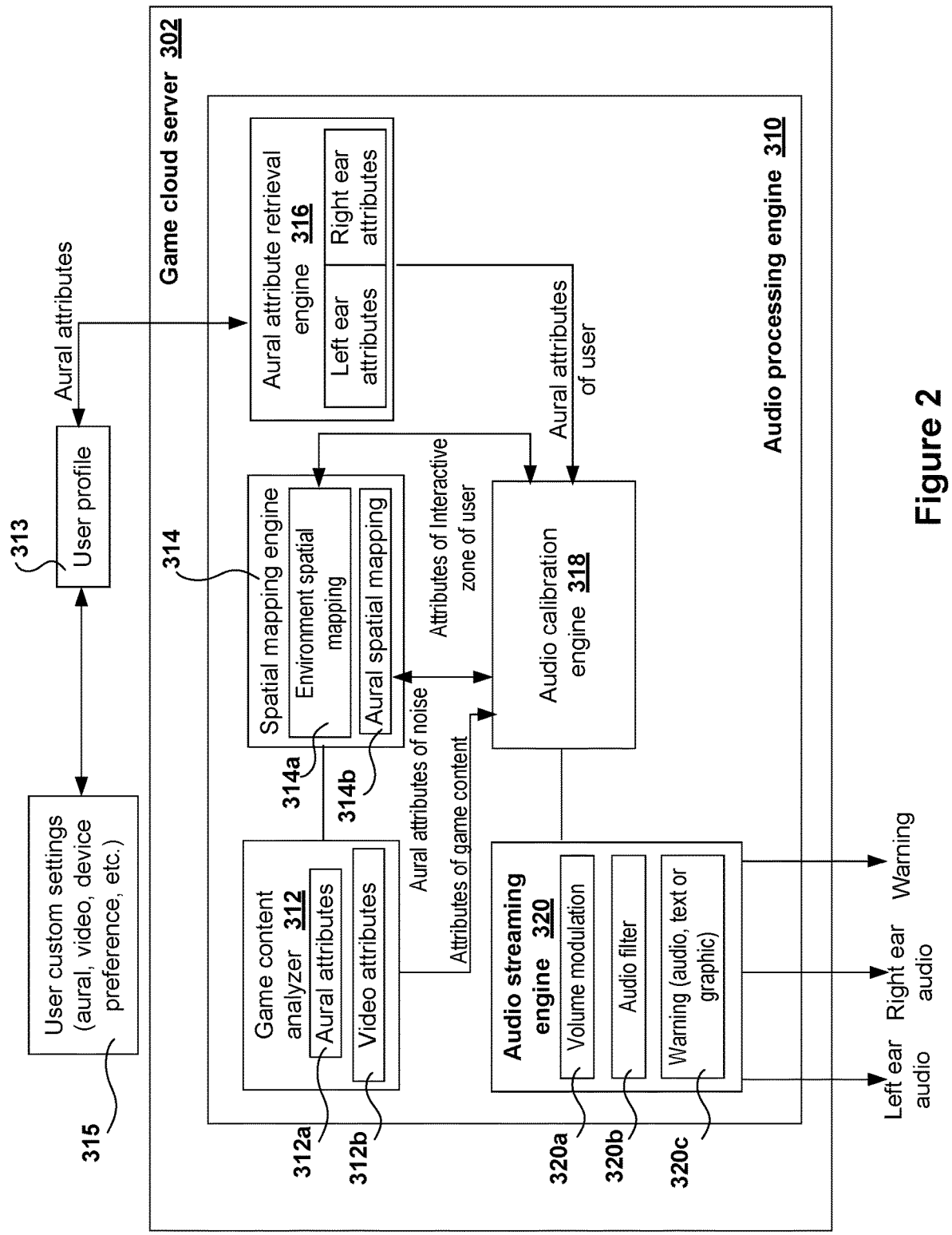
FIG. 2 illustrates a simplified audio processing engine executing on a game cloud server that is part of a game cloud system for processing game audio generated from executing a video game, in accordance with one implementation of the present disclosure.

FIG. 2 illustrates an example audio processing engine 310 with a plurality of components to process audio provided to a user, in accordance with some implementations. The audio processing engine 310 can be executing locally on a game console (116 of FIG. 1A) or remotely on a cloud game server 302 that is part of a game cloud system (300 of FIG. 1B). Some of the components include game content analyzer 312, spatial mapping engine 314, aural attribute retrieval engine 316, audio calibration engine 318 and audio streaming engine 320. The aforementioned components are provided as mere examples and should not be considered restrictive or exhausting.

The game content analyzer 312 of audio processing engine 310 is used to determine context of the interactive application that a user has selected for interaction. The interactive application can be a video game and the user interaction can be selection action selecting the video game for game play. Game inputs provided during game play of the video game are processed, game state updated and game content including game video and game audio generated and forward to the user for rendering. The game may be a high-intensity or a low-intensity game. If the user is interacting with a high-intensity video game or high-intensity portion of the video game, the user would not want to be disturbed.

As part of game content analyzer 312, the aural attributes 312a and the video attributes 312b of the game content are first determined. The aural attributes 312a can be used to identify details of game audio generated for the video game including different sounds (action-related, event-related, game environment-related, etc.) of the game captured within, music, speech, effects, and game-related inputs. Music can include background music aspect, emotional aspect (scary vs. comical, serious vs. sad), tempo aspect (fast vs. slow), etc. Speech can be used to determine if the game audio originated from a game character, provided by a user as voice inputs to the game or as interactions with another user or a spectator, etc. The tempo can be used to determine the intensity of the game. Sound effects are provided to confirm an activity or an action performed in the game, identify a sense of reality, etc. Similarly, game video attributes 312b identify game character attributes, performance of game characters during game play, types of interactions performed in response to game inputs, quality of such interactions, type and quality of actions performed using game inputs of users, quality of game scene, etc. The aural attributes 312a and the video attributes 312b can be used to determine the context, current state, the intensity of the game, which can be used to determine a level of immersion of the user in the game. The aural attributes 312a and video attributes 312b along with analysis data are forwarded as inputs to other components of the audio processing engine 310 for further processing.

The spatial mapping engine 314 of the audio processing engine 310 is configured to perform a spatial mapping of the three-dimensional real-world environment in which the user is operating, and use the spatial mapping to monitor the real-world environment of the user. The spatial mapping is performed to identify an interactive zone of the user in the real-world environment and to determine if changes occur or are predicted to occur in the real-world environment that can potentially distract the user during game play of the game. The interactive zone of the user can dynamically change due to the user moving around in the real-world environment during their interaction with the game. The spatial mapping takes into consideration the dynamically changing interactive zone to monitor the real-world environment for any changes that can affect the user during game play of the game, so that appropriate notification or warning can be provided to the user.

The spatial mapping engine 314 engages an environment spatial mapping engine 314a and aural spatial mapping engine 314b to perform the real-world environment mapping and the aural spatial mapping. The environment spatial mapping engine 314a can activate and use images of the real-world environment captured by one or more image capturing devices disposed in the real-world environment, in the client device and/or input devices of the user, or the game console or computing device that is communicatively coupled to the client/input devices of the user. The images of the real-world environment are captured from different directions and used to construct a three-dimensional (3D) map of the real-world environment using triangulation technique. The 3D map of the real-world environment is used to define an interactive zone of the user within the real-world environment and as the user moves around in the real-world environment, the interactive zone is dynamically updated.

The aural spatial mapping engine 314b is configured to perform the aural spatial mapping to identify sound or noise generated in the real-world environment and to determine a direction from which the sound originates. For example, the sound or noise may be generated in the real-world environment by a person talking, opening/closing a door, or striding toward the user, or a pet barking, meowing, or running toward the user as the user is interacting with the game. The various attributes of the sound (e.g., type, direction, volume, pitch, tempo, etc.,) generated by the person or pet approaching the user are captured using one or more external microphones disposed in the real-world environment or from a microphone array available at a client device (e.g., controller, HMD, other input device, etc.,) and along with the 3D mapping of the real-world environment used to identify a specific direction from which the sound originates in relation to the user. The aural attributes of the sound are provided to an audio calibration engine 318 as input. Further, the 3D mapping details of the real-world environment including the interactive zone of the user are provided as inputs to the audio calibration engine 318 for further processing.

The aural attributes of the user, including the left ear attributes and the right ear attributes are retrieved by the aural attributes retrieval engine 316 and provide as input to the audio calibration engine 318. In some implementations, the aural attributes of the user may be part of user profile of the user stored in a user profile datastore 313. The aural attributes can be retrieved in response to detecting a person, pet or a real-world object approaching the user that can affect game play of the game.

The audio calibration engine 318 analyzes the aural attributes of the sound generated in the real-world environment and the attributes of the interactive zone of the user to determine the proximity of the person or pet to the user and the likelihood of the person or pet distracting the user while the user is interacting with the game. Based on the analysis, the audio calibration engine 318 generates a notification to warn the user of the relative proximity of the person or pet to the user. In some implementations, in addition to generating the notification to the user, the audio calibration engine 318 also identifies the specific ear of the user to forward the notification, wherein the specific ear of the user for providing the notification is identified to align with the direction of the sound introduced by the person or pet approaching the user. The user usually listens to the game audio using headphones so that they don't get distracted by noises or sounds that are external to the game. This allows the user to have a truly immersive game play experience. The notification along with the game audio is provided through the headphone of the user. In one implementation, the notification is forwarded to a first side of the headphone directed toward a first ear (i.e., either left ear or right ear) that aligns with the direction of the sound, and the game audio is forwarded to a second side of the headphone directed toward the second ear of the user.

In some implementations, the notification is provided to the user as an audio notification (e.g., voice notification, a specific sound, etc.). In this implementation, the game audio is selectively provided to the second ear and the notification is selectively provided to the first ear. In alternate implementations, the first ear of the user is provided with the game audio along with the notification, while the second ear is provided with only the game audio. In this implementation, the game audio may be presented in the background while the sound is presented in the foreground. Further, the volume of the game audio can be dynamically reduced and the volume of the notification dynamically increased in response to detecting the person continuing to move toward the user. The notification and the game audio are provided to the user in accordance to the aural attributes of the user, wherein the aural attributes specify the volume, the frequency, etc., at which the game audio and the notification is to be provided to the user. The aural attributes can include a sound score defined to indicate a tolerance level of each ear of the user to different sounds and noise levels. The aural attributes including sound scores can be part of custom settings 315 provided by the user during initial setup of the system or the video game, or can be determined by conducting an aural test. The user's custom settings 315 can define preferences of the user to video, device used for providing inputs and for displaying interactive content, aural preferences including aural attributes, ear preference or providing interactive audio (e.g., which ear to provide the game sound, which ear to provide warnings or other sounds, etc.). The aural attributes identified for each ear of the user can be stored in the user profile 313 and used every time audio (either game audio, voice notification, etc.) is to be provided to the user. In yet other implementations, instead of providing a separate audio notification in addition to the game audio, the notification provided to the user could be in the form of increased volume of the game audio forwarded to the first side of the headphone and directed toward the first ear and the game audio provided at normal volume to the second side of the headphone directed toward the second ear. The volume of the game audio provided to the first side is dynamically increased so as to block the sound provided by the person/pet approaching the user to ensure that the user is not distracted by the sound. The extent to which the volume of the game audio is increased is dictated by the aural attributes of the user so as to ensure that the increased volume does not cause any harm to the user's hearing but is sufficient to block the unwanted environmental sound introduced by the person/pet.

In addition to or instead of notifying the user, the audio calibration engine 318 can generate a second notification that is output to the real-world environment and directed toward the person or pet, for example, generating the sound. The second notification may be generated and directed toward the person, for example, to inform the person of a level of immersion of the user in the game play of the video game. For instance, based on the tempo of the game audio and the context of the game content, it may be determined that the user is engaged in a high-intensity game or high-intensity portion of the game or is at a critical part of the game that requires the user's focus. In such cases, the second notification is generated and directed to the person as a warning to indicate a level of immersion of the user (i.e., a level of intensity of the game that the user is immersed in) and to not disturb the user. In some implementations, the user can define or the system can specify when, how frequently and/or how quickly the notification has to be sent to the person and such specifics can be based on the notification specifics provided by the user, intensity of the game, proximity of the person, and/or the level of immersion of the user as determined from the context of the game content generated, from the game logic, from game inputs of the user, etc. The notification specifics may be stored in notification settings stored in the user profile or as part of the system settings of the user and retrieved when the second notification is to be provided to the person. On the other hand, if the user is not involved in a high-intensity game or is not at a critical part of the game, then, based on the notification specifics, the second notification may not be generated, or may be generated but not sent to the person or the pet. In some implementations, the second notification can be in the form of a warning sound or a voice output generated by the system or the controller, or provided visually via lights on the HMD or controller, or through haptic signals provided through the controller.

Alternately, the notification can be in the form of a special sound that is generated by the system, for example, and output to the pet responsible for introducing the unwanted sound in the real-world environment as the pet is approaching the user and is likely to cause distraction to the user during game play. The second notification can be a low pitch sound that only the pet can hear and react. The low pitch sound can be provided to distract the pet away from the interactive zone of the user.

Details from the audio calibration engine 318 including game content, notifications to the user and/or to the person/pet generated in accordance to the notification settings, user's custom settings and/or system settings are forwarded to the audio streaming engine 320. The audio streaming engine 320 packages notification content including audio notification and other forms of notification to the user/person/pet into data packets, in accordance to communication protocol defined for communication channel established between the client device and the game cloud server executing the audio processing engine 310. The generated data packets are forwarded to the client device(s) of the user along with the game content (game audio, game video) for rendering. For example, the game video is forwarded to the display screen of the client device for rendering and the game audio and voice notification (e.g., warning) directed to the user are forwarded to the headphones worn by the user for rendering. Specifically, the game audio and the voice notification including any warnings directed toward each ear are identified and provided separately (i.e., left ear audio and right ear audio) so that the appropriate audio is rendered to each ear of the user.

The various implementations are discussed with respect to dynamically adjusting audio provided to the user in response to detecting real-world objects (i.e., person, pet, real-world objects) entering the interactive zone of the user as the user is immersed in game play of a video game. The implementations are not restricted to providing notification when the user is involved in playing video games but can be extended to providing notifications when the user is involved/immersed in interacting in the metaverse space and/or any other interactive applications.

FIGS. 3A-1, 3A-2 illustrate an example of notifying a user that a person is approaching the interactive zone of the user, in one implementation. In FIG. 3A-1, User 1 is shown to be present in an interactive zone 122 while interacting with a video game that the user has selected for game play. The game audio is presented to user 1 via headphones worn by the user, as shown. Specifically, the game audio is directed to both the left ear and the right ear of the user. While the user is interacting with the video game from within the interactive zone 122, the real-world environment is monitored to detect any changes. The system may detect a person approaching the interactive zone 122 of user 1 using the aural spatial mapping and 3D spatial mapping of the real-world environment. The aural spatial mapping and/or the 3D spatial mapping of the real-world environment are used to identify the direction from which the person is approaching user 1. Responsive to detecting the direction from which the person is approaching the interactive zone 122 of user 1, the game audio directed toward each ear of user 1 is dynamically adjusted. FIG. 3A-2 illustrates one such example, wherein the person is shown to be approaching user 1 from the right side and responsively the volume of the game audio directed toward right side of the headphone providing audio to the right ear is enhanced so as to block the sound introduced by the person approaching user 1. In this example, the volume of the game audio directed toward the left side of the headphone providing game audio to the left ear is maintained at a normal level. The enhanced level and the normal level of volume of the game audio are defined based on the aural attributes specified for each ear of user 1. Further, the volume of the game audio directed toward the right ear can be enhanced for a duration of time the person is shown to be moving toward user 1. When the person stops moving toward user 1 or moves away from the interactive zone 122 of user 1, the volume of game audio directed toward the right side of the headphone is dynamically adjusted to render at the normal level. The enhanced volume of the game audio is defined to block the sound introduced by the person in the real-world environment as the person is approaching user 1 from the right side.

FIGS. 3B-1 and 3B-2 illustrate an alternate example, wherein a sound is generated to cause a real-world object to move away from user 1 interacting in the real-world environment, in one implementation. FIG. 3B-1 shows user 1 interacting with a video game from within an interactive zone 122 identified in the real-world environment. User 1 is provided with game audio via headphone while the game video is rendered on a display screen (not shown) of a client device (not shown). While user 1 is interacting with the video game, a pet is shown to be running toward user 1. If the pet is allowed to continue to approach user 1, the pet can cause distraction to user 1, which can subsequently lead to disruption of game play of user 1. To avoid such disruption of the game play of user 1, the system proactively monitors the real-world environment of user 1, detects presence of the pet in the real-world environment, generates a sound, such as a low pitch sound that only the pet can hear, and direct the sound to the pet via a controller 120 used by user 1 to provide game inputs, or via game console 116. The low pitch sound is delivered in a manner that can cause the pet to move away from the interactive zone of user 1. FIG. 3B-2 shows an example of a warning sound directed toward the pet via, (a) the controller, or (b) game console. Responsive to the low pitch sound, the pet is shown to scamper away from the interactive zone of user 1. During this time, user 1 is provided with game audio via the headphone and the delivery of the game audio to each ear of the user is in accordance to the aural attributes defined for the user and user 1 may not even be aware of the approaching pet.

Figure 4:
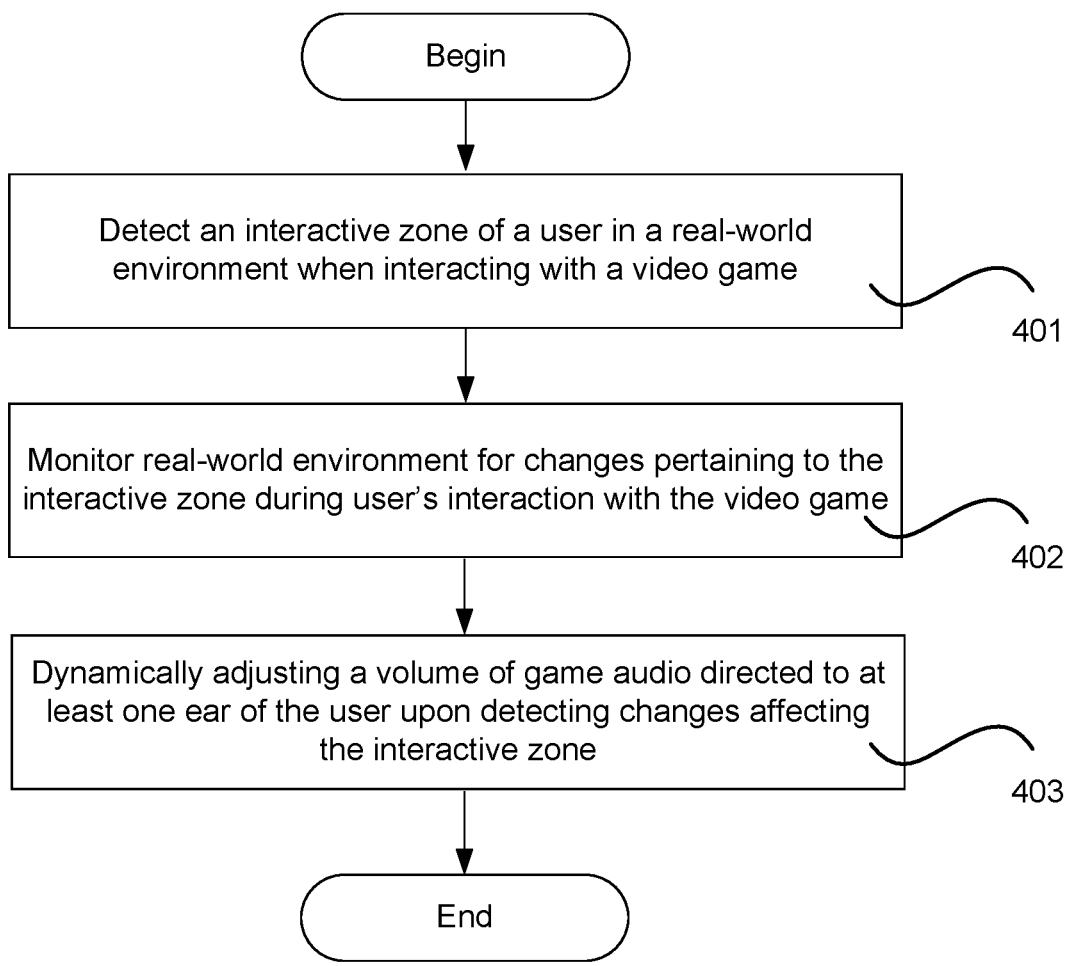
FIG. 4 illustrates a simplified flow of operations of a method for processing game audio generated by a video game, in accordance with one implementation of the present disclosure.

FIG. 4 illustrates flow of operations of a method for processing audio of an interactive application, such as a video game, provided to a user in accordance with one implementation. The method begins at operation 401 wherein an interactive zone of a user in a real-world environment is determined, in response to the user selecting the video game for game play. The interactive zone of the user is identified to be an area proximate to or surrounding the user in the real-world environment where the user is operating with the video game. The real-world environment is monitored for changes pertaining to the interactive zone during the user's interaction with the video game, as illustrated in operation 402. The changes can be due to a real-world object, such as a person or a pet, approaching the user while the user is interacting with the video game from within the interactive zone. The person or pet approaching the user can cause distraction to the user during game play, which can lead to disruption of the game play of the user. To avoid such distractions, a direction from which the person or pet is approaching is determined from spatial mapping of the real-world environment and using the spatial mapping to establish the direction of approach of the person or pet in relation to the user. The spatial mapping can include the aural spatial mapping using the sound introduced by the person or the pet, and 3D spatial mapping of the real-world environment in which the user is operating using the images from image capturing devices disposed in the real-world environment or embedded in one or more client devices operated by the user for providing inputs to the video game. Responsive to detecting the person or the pet approaching the user from a specific direction, a volume of the game audio provided to at least one ear of the user via the headphone, is dynamically adjusted so as to block the unwanted sound, as illustrated in operation 403. The at least one ear of the user is identified to be in the direction of the unwanted sound. As noted above, the volume of the game audio is dynamically adjusted for a time the unwanted sound exists due to the person or pet approaching the user and once the person or pet moves away or stops moving toward the user, the volume of the game audio directed to the at least one ear is dynamically adjusted to normal level, wherein the normal level is defined based on aural attributes of the at least one ear of the user.

The various implementations are described herein to prevent unwanted noise introduced by a real-world object approaching the user from distracting the user so the user can play the video game or interact with an interactive application (e.g., metaverse space) without disruption. Instead of adjusting the volume of the game audio, a notification (such as warning or an informative message, voice output, etc.,) can be provided to one ear (either left or right ear) of the user while the game audio is provided to the other ear (either right or left ear). The informative message, in some implementations, can include details of game play of the user, such as type of game, intensity level of the game, user's interest in the game play, level of immersion of the user in the video game, level of user's involvement in the game play, user's desire to be disturbed during game play or at specific level of immersion of game play, etc. In some implementations, a frequency and a speed at which the informative message is provided to the user may be defined in the custom settings defined by the user. Thus, when the user is to be informed of the changes in the real-world environment that is likely to affect them in the interactive zone, the informative message is generated and provided to the user in accordance with the frequency and the speed specified in the user's custom settings. For example, the user would not want to be disturbed when they are engrossed in a high-intensity portion of the game. Thus, when the system detects a person or pet approaching the user during such times, the user will be notified of the proximity of the person or the pet to the interactive zone and the frequency and speed with which the user is notified can be in accordance to the custom settings defined by the user. For example, the informative message may be forwarded more frequently and/or at greater speed when it is determined the person is getting closer and closer to the user as the user is engaged in a critical part of the game and can be forwarded less frequently when it is determined that the person is sufficiently far away or has ceased moving toward the user or is involved in low intense portion of the game. Other ways of providing notification to the user including adjusting the volume of the game audio to both ears of the user, providing specific sound along with the game audio to one ear, etc., can also be entertained.

The above defined way of notifying the user can be extended to generate and notify a person approaching the user in the interactive application. As with the frequency and the speed with which the user is notified, a warning message may be generated and directed toward the person to inform the person of the level of immersion of the user in the game and the intensions of the user during game play. For example, the intensions of the user may be to not be disturbed when the user is involved in a critical part of the game and the warning message may be generated and provided to the person in accordance to the intensions of the user as specified in the user's custom settings.

Figure 5:
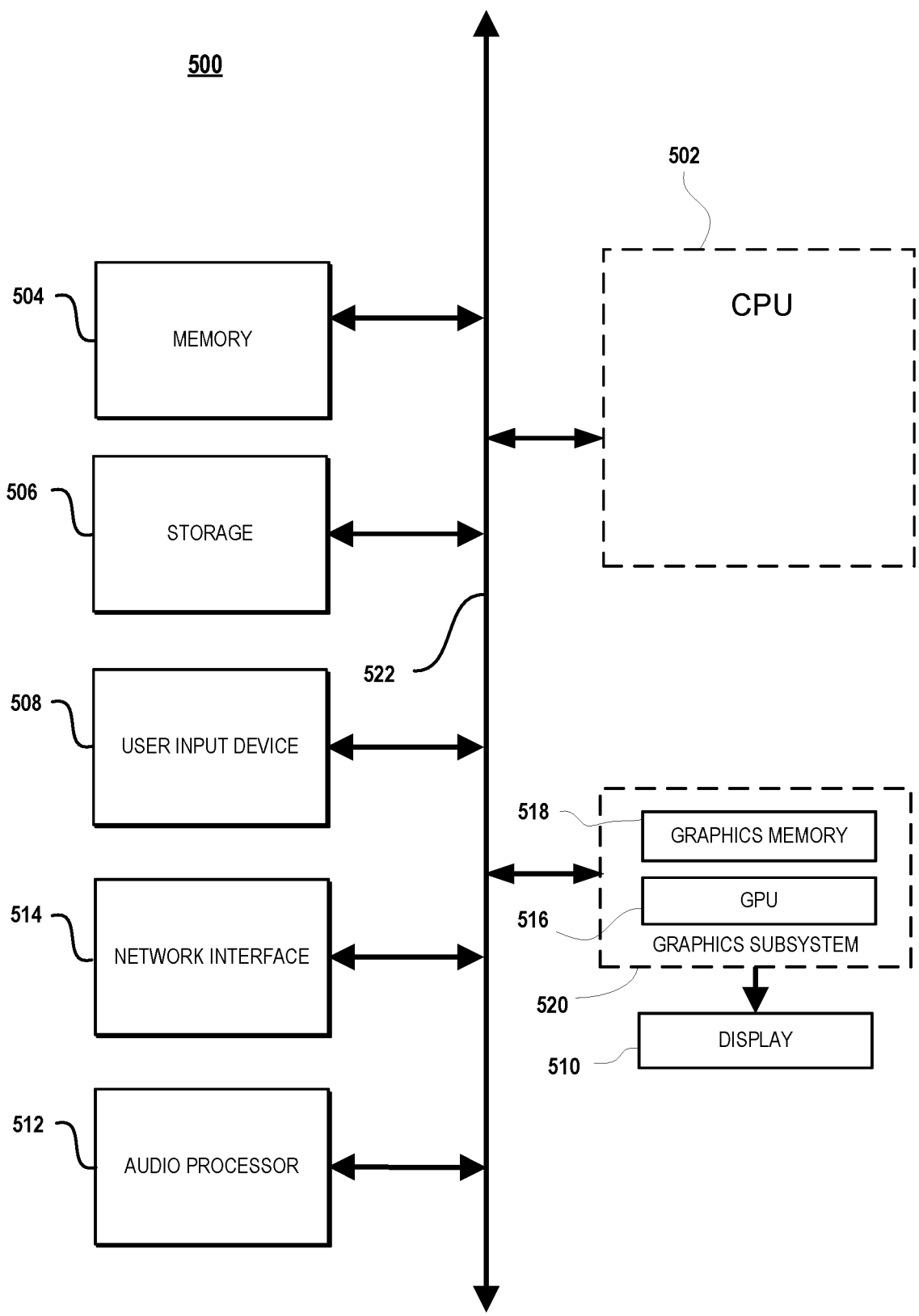
FIG. 5 illustrates a simplified conceptual game cloud system for providing audio generated for an interactive application, in accordance with one implementation of the disclosure.

FIG. 5 illustrates components of an example server device 500 that can be used to perform aspects of the various embodiments of the present disclosure. This block diagram illustrates the server device 500 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., back-end server processor), or one of many servers using virtualization in a game cloud system for remote streaming of game play to client devices.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 514, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. In addition to display device 510, the pixel data can be projected onto a projection surface. Device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers.

Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the mobile devices, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the cellular network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for processing audio for a user, comprising:
   detecting an interactive zone where the user is interacting with a video game, the interactive zone is a portion of a real-world environment in a vicinity of the user from where the user is accessing and interacting with the video game, the video game providing game content for presenting to the user, wherein the game content includes game scenes and the audio associated with the game scenes;

monitoring the real-world environment while the user is interacting with the video game to detect changes that can affect the interactive zone; and dynamically adjusting a volume of the audio directed to one side or both sides of a headphone providing the audio targeted toward one ear or both ears of the user, in response to detecting the changes, wherein dynamically adjusting the volume includes identifying a direction from where changes are detected in the real-world environment in relation to the user and dynamically adjusting the volume of the audio of the video game transmitted to a first side of the headphone directed to a first ear of the user that is in the direction of the changes so as to render a notification related to the changes transmitted to the first ear and maintaining the volume of the audio transmitted to a second side of the headphone directed to a second ear of the user, a volume of the notification adjusted based on a level of immersion of the user in the video game, and wherein operations of the method are performed by a processor of a computing device.

2. The method of claim 1, wherein dynamically adjusting the volume further includes lowering the volume of the audio transmitted to the first side of the headphone to allow the user to hear the notification transmitted to the first ear.

3. The method of claim 1, wherein the direction is identified by performing aural spatial mapping of the real-world environment in which the user is operating using anyone or a combination of microphone array available within a controller used to provide input to the video game, or a game console executing or providing the game content of the video game, or an external microphone disposed in the real-world environment proximal to the interactive zone.

4. The method of claim 1, wherein the volume is automatically adjusted in accordance to a sound score defined for said ear of the user, the sound score retrieved from a user profile of the user and specifies a tolerance level of each ear of the user to different sounds and noise levels.

5. The method of claim 1, further includes generating and directing a sound toward a person or a pet approaching the interactive zone of the user, the sound including a notification indicative of the level of immersion of the user in the video game, and generating and providing a warning to the user to notify the user of relative proximity of the person or the pet to the interactive zone.

6. The method of claim 1, further includes automatically generating and forwarding an informative message to a person approaching the user interacting in the interactive zone, the informative message provided to indicate the level of immersion of the user in the video game, and wherein the informative message is provided as a sound or a voice output through a speaker of a controller used by the user for providing input to the video game, or via a system executing the video game, or visually using light disposed on a head mounted display.

7. The method of claim 6, wherein the informative message is forwarded in accordance to a setting defined by the user, the setting defined in accordance to the level of immersion of the user.

8. The method of claim 6, wherein a frequency and a speed of forwarding the informative message is based on an intensity of the video game or a portion of the video game that the user is currently engaged in when the changes are detected.

9. The method of claim 1, wherein the changes detected in the real-world environment is due to a person or a pet approaching the interactive zone.

10. The method of claim 1, wherein the volume of the audio directed toward each ear of the user is in accordance to a sound score defined for said each ear of the user, the sound score retrieved from a user profile of the user defines a tolerance level of said each ear of the user to various sounds and noise levels.

11. A method for providing a warning to a person, comprising:

detecting an interactive zone within a real-world environment where a user is interacting with a video game, the interactive zone is a portion of the real-world environment in a vicinity of the user from where the user is accessing and interacting with the video game, the video game providing game content for presenting to the user, wherein the game content includes game video and game audio associated with the game video;

monitoring the real-world environment, while the user is interacting with the video game, to detect changes affecting the interactive zone, the changes caused by the person approaching the user in the interactive zone from a first direction;

dynamically adjusting a volume of the game audio directed to a first side of a headphone providing the game audio to a first ear of the user, in response to detecting the changes, the headphone is used to provide the game audio to the user; and automatically generating a sound directed toward the person responsible for the changes, the sound including a notification indicative of a level of immersion of the user in the video game, wherein operations of the method are performed by a processor of a computing device.

12. The method of claim 11, wherein the sound is forwarded to the person as the warning to cause the person to change direction away from the interactive zone, when the level of immersion indicates the user is engaged in high intensity video game or high intensity portion of the video game.

13. The method of claim 11, wherein dynamically adjusting the volume includes, identifying a direction from where the changes are detected in the real-world environment, the direction identified in relation to the user; and automatically adjusting the volume of the game audio of the video game transmitted to the first side of the headphone directed toward the first ear of the user that is in the direction of the changes detected in the real-world environment.

14. The method of claim 13, wherein the direction is identified by performing aural spatial mapping of the real-world environment in which the user is operating, the aural spatial mapping performed using anyone or a combination of microphone array available to a controller used to provide input to the video game, or a game console executing or providing the game content of the video game, or an external microphone disposed in the real-world environment proximal to the interactive zone.

15. The method of claim 13, wherein the volume of the game audio directed toward the first ear of the user is automatically adjusted in accordance to a sound score defined for the first ear of the user, the sound score is retrieved from a user profile of the user and is used to define a tolerance level of the first ear of the user to different sounds and noise levels.

16. The method of claim 13, wherein adjusting the volume of the game audio includes increasing the volume of the game audio transmitted to the first side of the headphone directed toward the first ear of the user that is in the direction of the changes detected in the real-world environment, and maintaining the volume of the game audio transmitted to a second side of the headphone directed toward a second ear of the user.

17. The method of claim 13, wherein a frequency and a volume of the sound directed toward the person is based on a level of intensity of the video game and proximity of the person to the interactive zone.

18. The method of claim 11, wherein the sound is not sent to the person, when the video game or a portion of the video game that the user is currently engaged in is of low intensity.

* * * * *